United States Patent [19]

Combot-Courrau et al.

[11] Patent Number: 5,487,572
[45] Date of Patent: Jan. 30, 1996

[54] QUICK-CONNECTION COUPLING

[75] Inventors: Yves Combot-Courrau, Thorigne Fouillard; Benoît Le Saint, Rennes; Jean-Noël Musellec, Rennes; Philippe Le Quere, Rennes, all of France

[73] Assignee: Legris S.A., Rennes, France

[21] Appl. No.: 210,388

[22] Filed: Mar. 18, 1994

[30] Foreign Application Priority Data

Mar. 19, 1993 [FR] France .................. 93 03198

[51] Int. Cl.⁶ .................................. F16L 37/084
[52] U.S. Cl. .................................. 285/308; 285/340
[58] Field of Search .................. 385/340, 105, 385/308

[56] References Cited

U.S. PATENT DOCUMENTS

| | | | |
|---|---|---|---|
| 2,445,580 | 7/1948 | Kasten | 285/340 X |
| 4,123,090 | 10/1978 | Kotsakis et al. | |
| 4,124,235 | 11/1978 | Grahl | 285/340 |
| 4,747,626 | 5/1988 | Hama et al. | 285/340 X |
| 4,919,457 | 4/1990 | Moretti | 285/340 X |

FOREIGN PATENT DOCUMENTS

| | | |
|---|---|---|
| 0330871 | 2/1989 | European Pat. Off. |
| 2385024 | 10/1978 | France . |
| 8536760 | 6/1989 | Germany . |

*Primary Examiner*—Dave W. Arola
*Attorney, Agent, or Firm*—Griffin, Butler, Whisenhunt & Kurtossy

[57] ABSTRACT

A coupling device for a tube, the device comprising a body provided with a bore for receiving the end of said tube, and means for retaining the tube in the bore, which means are constituted by an elastically deformable washer that is substantially frustoconical in shape whose inside circumference is of a diameter smaller than the outside diameter of the tube and which is subdivided into a plurality of teeth, the outside portion of the washer being disposed in a groove formed in the bore. Each tooth possesses a short root portion which, at rest, extends in a radial plane, and an active portion that is inclined relative to the radial plane of the root, and each tooth is connected to the teeth adjacent thereto via small section peripheral link portions of length not less than the length of each tooth.

9 Claims, 2 Drawing Sheets

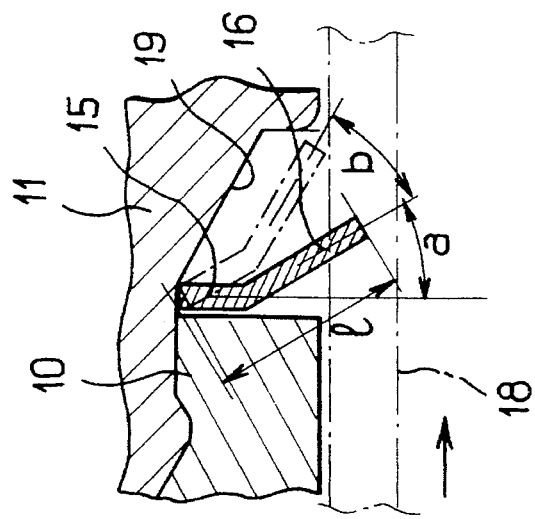
FIG._3
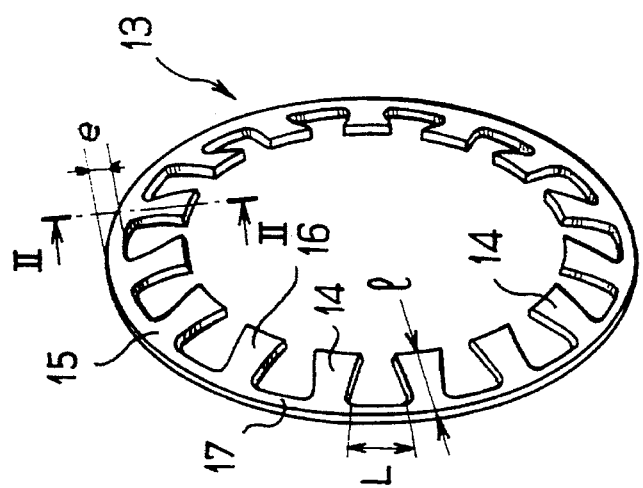
FIG._2
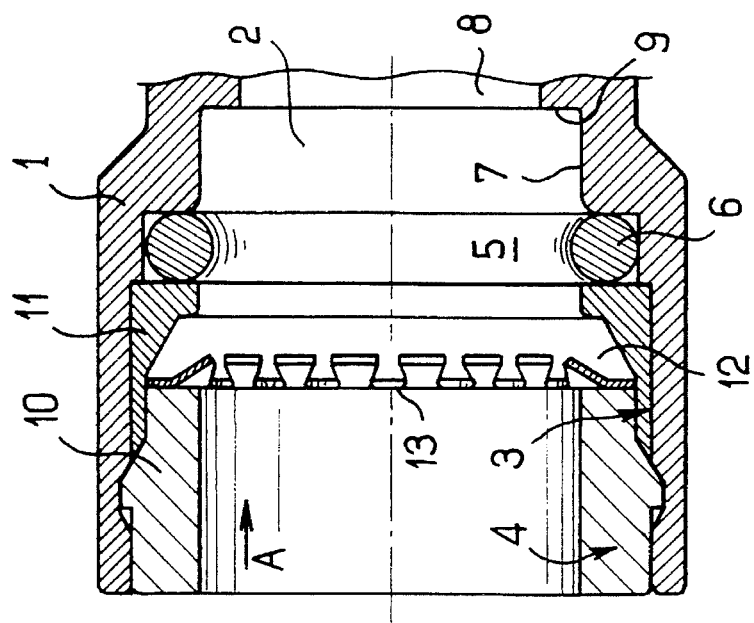
FIG_1

QUICK-CONNECTION COUPLING

The present invention relates to a quick-connection coupling of small size.

BACKGROUND OF THE INVENTION

Numerous devices exist enabling a duct to be quickly connected to an intermediate coupling device, either between said duct and another duct, or between said duct and apparatus in an installation (flow control valve, actuator, . . . ), whether added to or integrated within said apparatus.

The coupling device includes means adapted, once the end of the duct has been freely inserted into a bore designed for receiving said end, to hold the end therein in sealed manner against a force tending to pull it out. In addition to having a sealing ring, said means may have members of two main types: a washer having inside teeth that are splayed apart by bending during insertion of the tube and that tend to bite into the tube so as to oppose extraction thereof; and a claw having substantially longitudinal arms whose free ends have sharp edges directed towards the outside surface of the tube and each forming a wedge that is forced into the tube when an attempt is made to pull it out, wedging being obtained by means of a camming surface provided for that purpose in the bore.

The invention relates to quick couplings including means of the first type, i.e. a washer provided with inside teeth.

Most couplings having a toothed washer include flexible teeth attached via their roots to a rigid ring which is received in a groove in the bore. The groove is generally formed between a shoulder of the bore and an insert, thereby enabling the ring to be clamped or even deformed so that the slope of the teeth is altered if the ring does not occupy a radial plane when at rest. In other cases, the groove is formed completely in an insert which is pre-fitted with the washer. In order to ensure that the force opposing insertion of the tube is not too great, it is necessary for the teeth to have a degree of flexibility so that they splay apart easily to allow the end of the tube to pass between them. Such flexibility is obtained by cutouts and recesses in the teeth, but that is detrimental to their ability to bite into the outside surface of the tube. In addition, since the teeth are relatively flexible, it is often observed that it is possible to move the tube rearwards after it has been inserted in the coupling. This rearward movement that may take place under a small traction force causes the end of the tube to be displaced within the terminal portion of the bore in which it is accurately guided. A reduction in the guidance bearing area therefore gives rise to a reduction in the quality of tube retention in the coupling. It is then observed that the tube becomes easier to ovalize, which has the consequence of reducing the quality of sealing at the coupling, and of unbalancing the forces transmitted to the periphery of the tube by the teeth, which can be a cause of untimely disconnection.

In addition, outwards displacement of the end of the tube from its housing leaves a gap between the end shoulder of the housing in the body and the end of the tube, which gap becomes a dead volume in which harmful deposits can accumulate.

OBJECT AND SUMMARY OF THE INVENTION

The object of the present invention is to provide a coupling that remedies the above drawbacks, in particular by implementing a special washer.

To this end, the invention provides a coupling device for a tube, the device comprising a body provided with a bore for receiving the end of said tube, and means for retaining the tube in the bore, which means are constituted by a washer that is substantially frustoconical in shape whose inside circumference is of a diameter smaller than the outside diameter of the tube and which is subdivided into a plurality of teeth, the outside portion of the washer being disposed in a groove formed in the bore. According to the invention, each tooth of the washer is constituted by a rigid blade possessing a short root portion which, at rest, extends in a radial plane, and an active portion that is inclined relative to said radial plane, each tooth also being connected to the teeth adjacent thereto via elastically deformable peripheral link portions such that deformation of the washer as a whole gives rise to displacement of the teeth without deformation thereof.

A washer of the kind used in the invention is deformable practically only at its portions that link together the blades thereof. These link portions interconnect the teeth via their roots and they are highly deformable elastically so that during insertion of the tube the system behaves as though the teeth were pushed back (displaced) radially without deformation, all of the deformation being concentrated in the link portions performing composite motions. In addition, the force required to open up the washer is very small. The teeth are thus splayed outwards and take up a much more axial orientation (their angle relative to the radial plane may vary through about 40° to 50°), such that each of them constitutes an extremely stiff "wedge" that is very strong since it acts essentially in compression between the groove and the tube into which it bites. By an appropriate choice of dimensions for the groove and for the tube, it is possible to secure the tube in a manner that prevents any rearwards movement thereof (ignoring tolerances).

In order to obtain the greatest possible chance of the blades biting into the tube, the blades are trapezium-shaped with their large bases being situated at the inside edge of the washer.

In a particular embodiment, the angle between the root of a blade and the active portion is about 25°. In addition, relatively advantageous flexibility is obtained when the ratio between the width of the link portion and the total width of the toothed washer is of the order of one-fifth.

To leave a large amount of clearance for each blade while a tube is being inserted, the groove in the bore that receives the peripheral portion of the washer has a downstream flank in the tube-insertion direction that is inclined.

In order further to benefit from another advantage of a washer constituted in this way, it may be advantageous for the following reasons to provide, in addition to the inclined flank, a groove bottom that is of width that is considerably greater than the thickness of the washer.

If the device includes a tubular pusher slidably mounted inside the bore between an inactive extended first position and an active retracted second position in which the blades of the washer are splayed apart from their rest position by the nose of the pusher, in accordance with the invention, the nose of the pusher in its inactive position may constitute an abutment for the blades when an excessive tube-extracting force is applied, with each blade pivoting about the abutment so that the peripheral portion of the washer then bears against the inclined flank of the groove. In this position, the active portions of the teeth are practically radial and penetrate maximally into the wall of the tube. If the extraction force continues to be applied, then the blades are deformed by bending between the nose and the tube, thereby causing said tube to resist said extraction force much more strongly than it did initially.

Finally, because of the structure of the washer, it is possible to find dimensions such that in the event of said washer being "turned insideout" by the pusher, it takes up a second stable shape in which it can allow the tube to be fully extracted without damaging the washer. Since the coupling is not destroyed, it can be reused with reinsertion of a tube into the coupling tending to cause the washer to pass from its second stable position back to its rest position and subsequently to operate in normal manner.

Other characteristics and advantages of the invention appear from the following description of an embodiment thereof.

BRIEF DESCRIPTION OF THE DRAWINGS

Reference is made to the accompanying drawings, in which:

FIG. 1 is an overall illustration of a coupling of the invention;

FIG. 2 is an outside view of a washer used in the coupling;

FIG. 3 is a diagram showing how the washer of the invention operates;

MORE DETAILED DESCRIPTION

Figure 5:
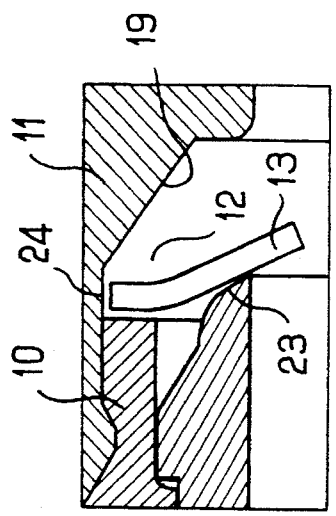
FIG. 5 is a diagrammatic section view showing the state of the coupling device in the absence of a tube.

FIG. 1 is a section view through a coupling device for a tube that comprises a body 1 which is provided with a bore 2 that is axially subdivided into four portions, namely, from left to right: a large diameter portion 3 for receiving an insert 4; a smaller diameter portion 5 for receiving an O-ring 6; a portion 7 whose diameter is substantially the same as the outside diameter of the tube to be inserted in the coupling; and a portion 8 whose diameter is substantially equal to the inside diameter of the tube. Between the portions 7 and 8, a shoulder 9 constitutes an abutment against continued insertion of the tube into the coupling. In one particular embodiment, the portion 7 of the bore may be slightly conical, its small base being directed towards the portion 8, thereby setting up a small amount of compression in the wall of the tube when it penetrates into said portion 7.

In this case, the insert 4 comprises two portions 10 and 11 which are inserted and held by force in the body 1 using a known technique, particularly if the body 1 is made of a plastics material and the insert portions are made of metal. Between them, the two portions 10 and 11 define a groove 12 which constitutes a housing for a washer 13 provided with teeth for engaging and retaining the tube that is to be inserted in the bore 2.

The washer 13 is shown in perspective in FIG. 2, and a portion thereof is shown in section in FIG. 3, e.g. on a plane II—II of FIG. 2. The washer thus comprises a plurality of internal teeth formed, in this case, as blades 14 where each blade has a root 15, such that, while the washer is at rest, it extends in a substantially radial plane, plus an active portion 16 which forms an angle a relative to the root 15. The active portion of each blade is substantially plane or slightly conical.

Each blade or tooth is connected to the adjacent blade via a peripheral link portion 17 of small section, i.e. its width is no greater than the width of the root 15. In addition, each link portion 17 has a peripheral length L that is not less than the length l of each tooth. The blades are thus widely spaced apart from one another at their roots so that the link portions are not too stiff and are easily capable of accepting twisting deformation. In contrast, each blade constitutes a body that is undeformable and that pivots as a block, as can be seen with reference to FIG. 3. Finally, each blade is trapezium-shaped having a root that is narrower than its free end so that the sum of the lengths of the free end edges of the teeth co-operating with a tube is large enough for grip to be well distributed around the circumference of the tube. Thus, the sum of the lengths of said edges is not less than half the outside circumference of the tube.

In a preferred embodiment given below by way of non-limiting example, the angle a is of the order of 25°, whereas the width e of each link portion 17 is equal to no more than one-fifth of the total width of the washer i.e. the above-defined length l.

FIG. 3 shows the tube 18 inserted in the bore 2. The presence of this tube has the effect of lifting each of the blades which, acting as undeformable bodies, rotate about their respective link portions connecting them to the adjacent blades in the bottom of the groove 12 in which the washer is received. The amount of rotation to which the blade referenced b is subjected depends essentially on the difference between the outside diameter of the tube 18 and the inside diameter of the washer 13 when at rest, and in certain embodiments, this angle b may be as great as 40°. For such pivoting to be possible, the groove 12 possesses a flank 19 that is inclined. This flank is situated downstream relative to the tube insertion direction A, the bottom of the groove being of a width in the example of FIG. 3 that is substantially equal to the thickness of the washer 13.

Under such conditions, during tube insertion, the blades merely rotate outwardly without significant displacement of the washer in the tube insertion direction. Once the tube has been put into place, the washer thus takes up the shape shown in chain-dotted lines in FIG. 3, with its active portion then being at an angle of about 25° relative to the axis of the tube.

An extraction force applied to the tube 18 in the direction opposite to the tube insertion direction A increases the force with which each blade bites into the wall of the tube and tends to cause each blade to rotate towards the position it occupies when the washer is at rest. Given the highly inclined position of each blade relative to the axis of the tube, and given its stiffness (no buckling), it will be observed that a small amount of rearwards motion imparted to the tube gives rise to penetration motion of each blade into the tube through an amplitude that is at least as great as, if not greater than, the amplitude of the rearwards motion. This active penetration of each blade into the tube constitutes a highly effective means for preventing rearward motion of the tube.

Figure 4:
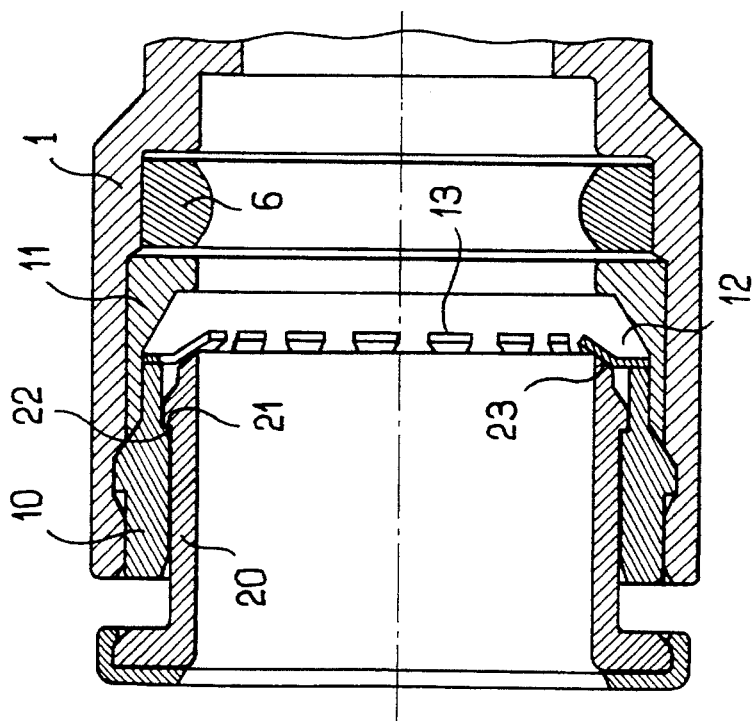
FIG. 4 is a diagrammatic section through an embodiment of the coupling of the invention that uses a pusher for decoupling the tube.

In addition to the elements already described with reference to FIG. 1, the coupling shown in section in FIG. 4 further includes a tubular pusher 20 that is slidably movable inside the portion 10 of the insert between an inactive extended position in which it has a shoulder 21 in abutment against a shoulder 22 of said portion 10, in which case the washer 13 merely presses against the nose 23 of said pusher 20, and a retracted position in which the shoulders 21 and 22 are spaced apart from each other and the nose 23 splays apart all of the blades 16. Such a disposition is well known in couplings of this type.

In FIG. 5, which is a detailed view in section, there can be seen the washer 13 in its rest position received in a groove 12 having a bottom 24 that is wider than the thickness of the washer 13. It may also be observed that the diameter of the groove 12 as measured in the bottom 24 thereof is slightly greater than the outside diameter of the washer 13 such that clearance is left between the washer 13 and the groove 12 for reasons that are explained below.

Figure 6:
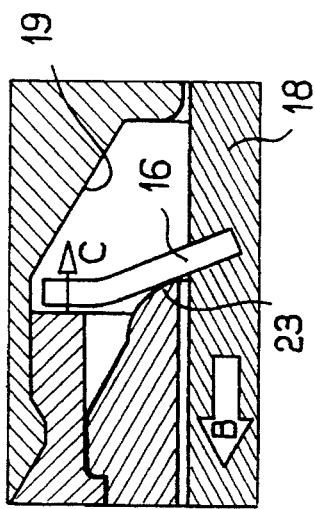
FIGS. 6 and 7 are diagrams showing how the toothed washer behaves inside the FIG. 4 device when an excessive extraction force is applied to the tube.
Figure 7:
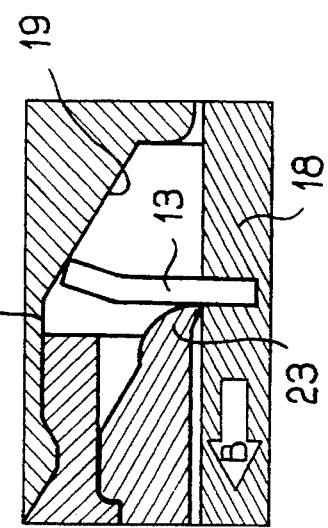

In FIG. 6, which is a view similar to that of FIG. 5, it can be seen how the coupling behaves when the tube 18 is subjected to excessive extraction force. By the time the situation shown in FIG. 6 has been reached, the washer 13 has been brought back into a position close to that which it occupies at rest, with each of the blades 16 biting deeply into the wall of the tube 18. Continued application of this extraction force brings the blades 16 to bear against the nose 23 of the pusher 20 which constitutes a fixed element (only slightly deformable) about which each blade tends to tilt beyond the rest position of the washer, thereby driving the peripheral portion of the washer in rotary motion in the direction marked C in FIG. 6. This rotation is made possible because of the flexibility in twisting of the link portions 17 at the periphery of the washer, between the blades. It is then observed that the washer snaps suddenly from its rest shape to a different shape as shown in FIG. 7 where the blades 16 occupy a plane that is substantially radial while the roots 15 are inclined relative to said plane. The washer is capable of snapping from the shape shown in FIG. 6 to the shape shown in FIG. 7 specifically because of the above-mentioned clearance. It can be seen that in its new shape, the peripheral portion of the washer bears against the inclined flank 19 of the groove 12 such that continued application of traction on the tube 18 is prevented by the washer which can no longer pivot about the nose of the pusher since its periphery is in abutment against the flank 19. The active portion 16 of each blade is then subjected to bending only and the force that can be applied depends on the nature of the material from which the tube 18 is made. By way of example, it may be observed that in the position shown in FIG. 7, the washer is capable of withstanding traction lying in the range 240 Newtons to more than 1,000 Newtons depending on whether the tube is made of plastics material or of metal.

It will thus have been observed that under normal conditions of force being applied to the tube in a direction suitable for extracting it from the coupling, the teeth or blades of the washer are effective because they withstand buckling.

Once normal conditions have been exceeded, the teeth operate as radial obstacles to extraction and they are subjected to stresses of a different kind. They may therefore have different characteristics for withstanding extraction depending on whether the tube is subjected to a normal amount of force or to an excessive amount of force.

In the embodiment that enables the state of the washer to be changed, the clearance that is required to enable a change of state to take place allows a tube engaged on the washer to move rearwards a little, through a distance that can be limited by keeping the clearance available at the bottom of the groove down to the necessary minimum.

We claim:

1. A coupling device for a tube, the device comprising a body provided with a bore for receiving the end of said tube, and means for retaining the tube in the bore, which means are constituted by an elastically deformable washer that is substantially frustoconical in shape, whose inside circumference is of a diameter smaller than the outside diameter of the tube, and which is subdivided into a plurality of teeth, the outside portion of the washer being disposed in a groove formed in the bore, wherein each tooth possesses a short root portion which, at rest, extends in a radial plane, and an active portion that is inclined relative to the radial plane of the root, and wherein each tooth is an undeformable body connected to the teeth adjacent thereto via elastically deformable peripheral link portions such that deformation of the washer as a whole gives rise to displacement of the teeth without deformation thereof.

2. A device according to claim 1, wherein each tooth is trapezium-shaped, with its larger base being situated at the inside edge of the washer.

3. A device according to claim 1, wherein the angle between the root of each tooth and the active portion thereof is of the order of 25°.

4. A device according to claim 1, wherein the length of each peripheral link portion is not less than the length of each tooth.

5. A device according to claim 1, wherein the ratio between the width of the link portions and the total width of the tooth washer is about one-fifth.

6. A device according to claim 1, wherein the groove in the bore receiving the peripheral portion of the washer has a downstream flank that is inclined.

7. A device according to claim 6, wherein the bottom of the groove is of a width that is greater than the thickness of the washer.

8. A device according to claim 6, including a tubular pusher slidably mounted inside the bore to slide between an inactive extended first position and an active retracted second position, in which the teeth of the washer are splayed apart from their rest position by the nose of the pusher, wherein the nose of the pusher, when in its inactive position, constitutes an abutment for the teeth when an excessive extraction force is applied to the tube, each tooth pivoting thereabout so that the peripheral portion of the washer then bears against the inclined flank of the groove.

9. A device according to claim 8, wherein after pivoting, the washer is in a second stable shape in which the root of each tooth is inclined while the active portion thereof lies in a plane that is substantially radial.

* * * * *